United States Patent [19]

Lee

[11] Patent Number: 5,247,582
[45] Date of Patent: Sep. 21, 1993

[54] DEVICE PREVENTING OSCILLATION AT THE TIME OF NO SIGNAL

[75] Inventor: Sang Y. Lee, Kyeongki-do, Rep. of Korea

[73] Assignee: Gold Star Co., Ltd., Seoul, Rep. of Korea

[21] Appl. No.: 752,940

[22] Filed: Aug. 30, 1991

Related U.S. Application Data

[63] Continuation of Ser. No. 380,747, Jul. 17, 1989, abandoned, which is a continuation of Ser. No. 39,238, Apr. 17, 1987, abandoned.

[30] Foreign Application Priority Data

Apr. 17, 1986 [KR] Rep. of Korea ............ 5148/1986[U]

[51] Int. Cl.$^5$ .............................................. H03G 3/00
[52] U.S. Cl. ...................................... 381/93; 381/94; 358/198
[58] Field of Search .................. 381/93, 94, 120, 121, 381/123; 358/335, 143, 167, 188, 198; 360/33.1

[56] References Cited

U.S. PATENT DOCUMENTS

| | | | |
|---|---|---|---|
| 3,922,641 | 11/1975 | Gates, Jr. | 360/33.1 |
| 4,031,541 | 6/1977 | Kato et al. | 358/335 |
| 4,455,573 | 6/1984 | Yamamoto et al. | 358/198 |
| 4,488,179 | 12/1984 | Kreiger et al. | 358/198 |
| 4,525,820 | 6/1985 | Enoki et al. | 381/123 |
| 4,581,645 | 4/1986 | Beyers, Jr. | 358/181 |
| 4,615,044 | 9/1986 | Killion | 358/143 |

Primary Examiner—Donald J. Yusko
Assistant Examiner—Edwin C. Holloway, III

[57] ABSTRACT

The invention relates to a device for preventing the oscillation when no signals are supplied to a VCR. A switching circuit is designed to prevent any oscillation from occurring even though a noise signal due to a signal not being supplied is generated i na feedback loop formed between the aural signal input and output terminals of the VCR and the TV.

According to the invention, the transmission line of the buffer operated by the emitter follower is formed between the aural signal input and output terminals of the VCR separately from the transmission line passing through the tuner/line transfer switch and the amplifier. In the normal condition under which the vertical synchronizing signal is detected, a feedback loop is formed through the transmission line passing through the tuner/line transfer switch and the amplifier. In the no signal state in which the vertical synchronizing signal is note detected, a feedback loop is formed through the transmission line of the buffer, so that oscillation does not occur when a signal is not supplied and thereby the oscillating noise signal is prevented from being output.

9 Claims, 2 Drawing Sheets

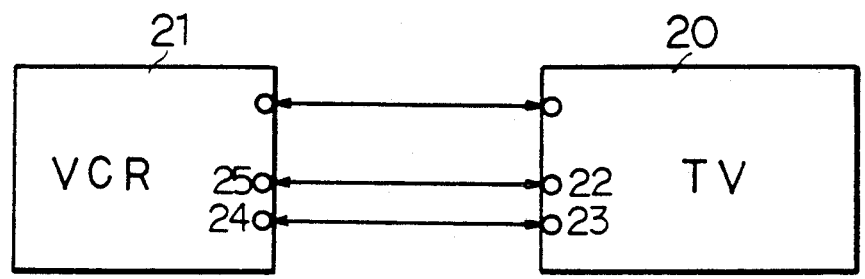
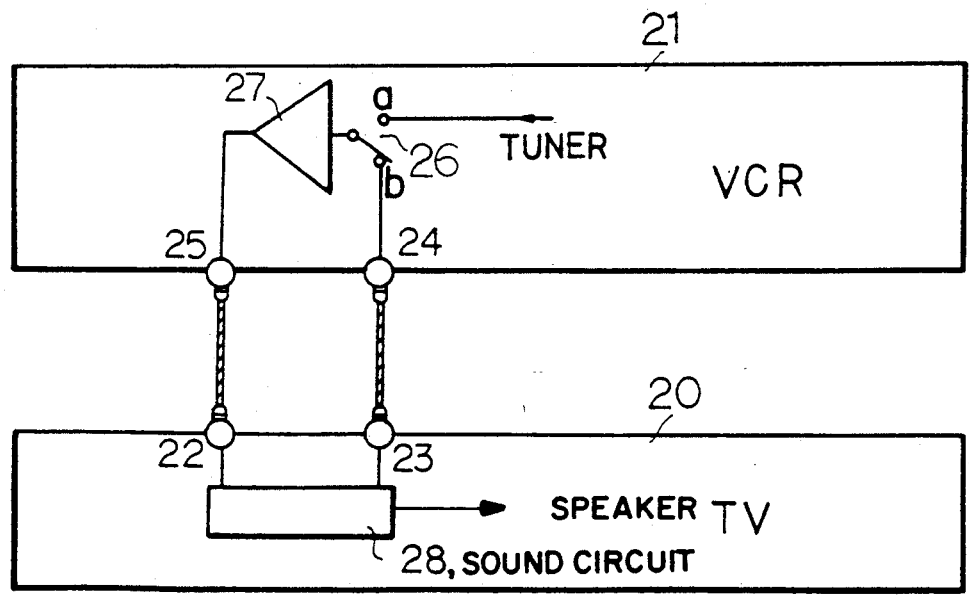

DEVICE PREVENTING OSCILLATION AT THE TIME OF NO SIGNAL

This application is a continuation of application Ser. No. 07/380,747 filed on Jul. 17, 1989, now abandoned, which is a continuation of application Ser. No. 07/039,238 filed on Apr. 17, 1987, now abandoned.

BACKGROUND OF THE INVENTION

The present invention relates to a device for preventing oscillation when no signals are supplied to a video cassette recorder (VCR). A switching circuit of the aural signal is formed in the interior of VCR so that oscillation by the noise signals of a feed back loop formed between the aural signal input and output terminals of VCR and TV does not take place when using a VCR and a television receiving set (TV) connected to each other. In general, a TV is designed to be used as a monitor by connecting the TV and the VCR with cables.

As shown in FIG. 1, TV 20 is, for example, designed to be used as a monitor by connecting the aural signal input and output terminals 22, 23, of TV to the aural signal input and output terminals 24, 25 of VCR 21 with cables. As shown in FIG. 2, however, if TV 20 is in a TV mode state such that the tuner/line transfer switch 26 of VCR 21 is transferred toward the point of contact (b) which is in a line state, a feedback loop is formed through the contact point (b) of tuner/line transfer switch 26 the amplifier 27 and the aural signal output terminal 25 of VCR 21, the aural signal input terminal 22, the sound circuit 28 and the aural signal output terminal 23 of TV 20, and the aural signal input terminal 24 of VCR 21. Since a noise signal is generated from such feedback circuit, and the noise signal is amplified and oscillated through the amplifier 27, the sound of the oscillation is output to the speaker of TV 20 even when both the VCR 21 and the TV 20 are in a no signal state.

Thus, according to such conventional device, there are problems created by the oscillation of the noise signal which may displease the audience and also a deterioration of the inner elements due to an excessive oscillation may result.

OBJECTS OF THE INVENTION

This invention originated by taking these aspects into consideration, and the object of the invention is to deter a self-oscillation condition from occurring due to an amplification of the noise signal when no signals are supplied to a VCR. Even through a feedback loop is formed by connecting a TV to a VCR any offensive noises from being output to the speaker are prevented.

According to the invention, this object is attained by forming a transmission line of the buffer operated by the emitter follower separately from the transmission line passing through the tuner/line transfer switch and the amplifier between the aural signal input and output terminals of VCR. A feedback loop is formed through the transmission line passing through the tuner/line transfer switch and the amplifier in a normal state in which a vertical synchronizing signal is detected, and a feedback loop is formed through the transmission switch of the buffer in a state in which no vertical synchronizing signals are detected.

BRIEF DESCRIPTION OF THE DRAWINGS

Embodiments of the invention will now be described in more detail, by way of example, with reference to the accompanying drawings. In the drawings, FIG. 1 is a schematic diagram showing the connecting conditions of the aural signal input and output terminals of the VCR and the aural signal input and output terminals of the TV, FIG. 2 is a schematic view showing the interior of the VCR and the TV.

DETAILED DESCRIPTION OF THE PREFERRED EMBODIMENTS

Figure 3:
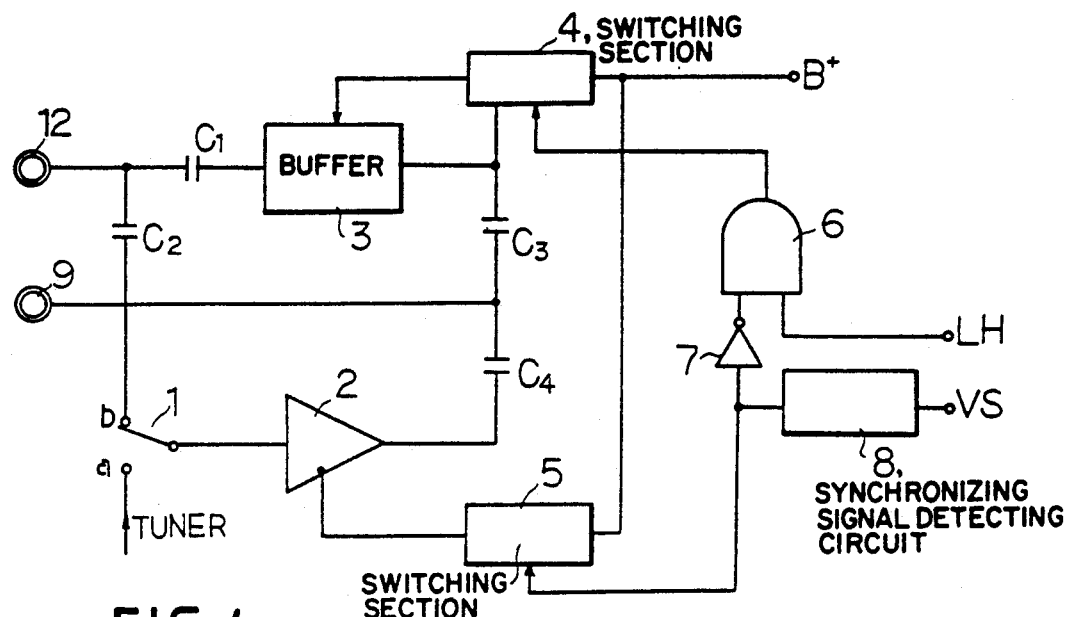
FIG. 3 is a block diagram of the device preventing oscillation when no signal is supplied by the VCR according to the invention.

As is shown in FIG. 3, which is a block diagram of the device preventing oscillation when no signal is supplied by the VCR according to the invention, the device is designed to be connected with and used for a TV by connecting the aural signal input terminal 12 of the VCR to the aural signal output terminal 9 of the VCR through the contact point of the condenser $C_2$ and the tuner/line transfer switch 1, the amplifier 2 and the condenser $C_4$. The device is comprised of connecting the aural signal input terminal 12 of the VCR to the aural signal output terminal 9 of VCR through the condenser $C_1$, the buffer 3 operated by the emitter follower and condenser $C_3$; connecting the power source B+ so as to supply the buffer 3 and the amplifier 2 through the switching sections 4, 5, respectively; connecting the output signal of the synchronizing signal detecting circuit 8 for detecting the vertical synchronizing signal VS so as to supply the switching section 5 and thereby control the on and off state of the switching section 5; and connecting the signal output of the synchronizing signal detecting circuit 8 passing through the inverter 7, and the line high signal LH so as to supply the switching section 4 through the AND gate 6 and thereby controlling the on and off state of the switching section 4. The synchronizing signal detecting circuit 8 is, when a vertical synchronizing signal VS of a regular cycle is applied to its input side, designed to detect the signal and output a high electrical potential to its output side.

Figure 4:
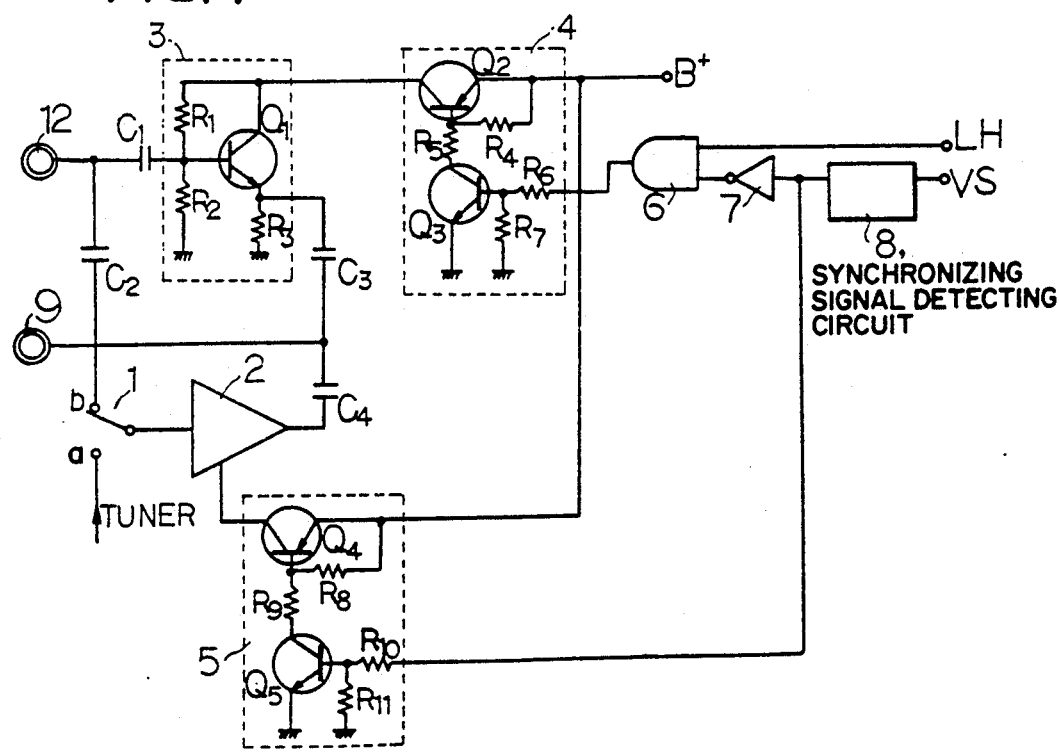
FIG. 4 is a detailed circuit diagram for the embodiment shown in FIG. 4.

As shown is FIG. 4, which is a detailed circuit diagram of the embodiment described in FIG. 3, the buffer 3 comprises the resistors $R_1$-$R_3$ and transistor $Q_1$, the switching section 4 comprises the resistors $R_4$-$R_7$ and transistors $Q_2$, $Q_3$, and the switching section 5 comprises the resistors $R_8$-$R_{11}$ and transistors $Q_4$, $Q_5$. The operation effect of the invention as described above will be described in detail as follows: Since no vertical synchronizing signal VS is generated in a state when the tuner/line transfer switch 1 of the VCR is transferred to the side of the contact point b which is in a line state, the low potential signal is output from the synchronizing signal detecting circuit 8. This low potential signal is reversed to a high potential signal at the inverter 7 and applied to the input terminal on the input side of the AND gate 6, while at the same time the line high signal (LH) is applied to the input terminal on the other side of the AND gate 6 so that a high potential signal is output from the AND gate 6. Since this high potential signal is applied to the base of transistor $Q_3$ through the resistor $R_6$ of the switching section 4 turning the transistor $Q_3$ on, the transistor $Q_2$ is also turned on. Consequently, the power source B+ is applied to the buffer 3 through the transistor $Q_2$ of switching section 4, so that the buffer 3 is in an operation state, while the low potential signal output of the synchronizing signal detecting circuit 8 turns the transistor $Q_5$ off through the resistance $R_{10}$ of the switching section 5. Thereby the transistor $Q_4$ is also turned off, so that the supply of power source B+ to the amplifier 2 is broken off and the amplifier 2 does not operate.

Thus, the signal applied to the aural signal input terminal 12 of the VCR does not pass through the condenser $C_2$ and the tuner/line transfer switch 1, the amplifier 2 and the transmission line of the condenser $C_4$. The signal is transmitted to the aural signal output terminal 9 of VCR through the condenser $C_1$, the buffer 3 and the transmission line of the condenser $C_3$.

In this case, because the amplification degree is less than 1, the oscillation is prevented even after the VCR and the TV are placed in a no signal state when the condition under which the aural signal input and output terminals 12, 9 of the VCR and the aural signal input and output terminals are connected with each other to form a feedback loop. Namely, since the buffer 3 is operated by the emitter follower and its amplification degree becomes less than 1, the output signal of the buffer 3 is gradually reduced and no oscillation takes place.

On the other hand, the vertical synchronizing signal VS is applied to the input side of the synchronizing signal detecting circuit 8 when the VCR is in a recording or reproducing mode so that the high potential signal is output from the synchronizing signal detecting circuit 8. Since such a high potential signal is reversed to a low potential signal by the inverter 7 and is applied to the input terminal on the input side of the ND gate 6, the low potential signal is output from the AND gate 6 so that transistors $Q_2$, $Q_3$ of the switching section 4 are turned off. Consequently, the power source B+ is not supplied to the buffer 3, and the signal applied to the aural signal input terminal 12 of the VCR does not pass to the transmission line of the condenser $C_1$, buffer 3 and condenser $C_3$.

At this time however, a high potential signal is output from the synchronizing signal detecting circuit 8 so that the transistors $Q_4$, $Q_5$ of the switching section 5 are turned on. Thereby, the power source B+ is supplied to the amplifier 2 so that the signal applied to the aural signal input terminal 12 of the VCR is transmitted to the output of the aural signal output terminal 9 of VCR through the contact point b of condenser $C_2$, the tuner/line transfer switch 1, the amplifier 2 and the condenser $C_4$.

As described above in detail, according to the invention, it is possible to prevent the oscillation caused by feedback when the VCR and the TV are not supplied with a signal, by automatically forming a different transmission line for the aural signal output depending on the mode used of the VCR in connection with the TV. Thereby, any oscillating noises that are offensive to the ear are prevented from being output to the speaker, and a deterioration of the inner elements due to the oscillation are also prevented. The invention has the effect to enhance the reliability of the products and not to cause any unpleasantness to the users due to the oscillating noise.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. An aural signal transmission line selection apparatus for selectively transmitting an aural signal to prevent oscillation in an audio-visual recording-reproducing system, comprising:

aural signal input means for receiving said aural signal from an external source into said audio-video recording-reproducing system;

vertical synchronizing signal means for detecting the presence of a vertical synchronizing signal and developing first and second signals having first and second levels, respectively, when said vertical synchronizing signal is present and said first and second signals having opposite first and second levels, respectively, when said vertical synchronizing signal fails to be present;

switching means operatively connected to said aural signal input means at said vertical synchronizing signal means for receiving said aural signal from said aural signal input means and for selectively transmitting said aural signal to one of first and second transmission lines in response to said first and second signals from said vertical synchronizing signal means, said aural signal being transmitted on said first transmission line when said first signal has said first level and said aural signal being transmitted on said second transmission line when said first signal has said opposite first level; and aural signal output means, operatively connected to said switching means by said first and second transmission lines, for outputting said aural signal from said audio-video recording-reproducing system.

2. An apparatus according to claim 1, wherein said first transmission line is selected when said vertical synchronizing signal is detected present by said vertical synchronizing signal means and said second transmission line is selected when said vertical synchronizing signal fails to be detected by said vertical synchronizing signal means.

3. An apparatus according to claim 1, wherein said first transmission line includes amplifying means.

4. An apparatus according to claim 1, wherein said first transmission line includes a first condensor, an amplifier, operatively connected to an output of said first condensor, and a second condensor, operatively connected to an output of said amplifier.

5. An apparatus according to claim 4, wherein said second transmission line includes a third condensor, a buffer, operatively connected to an output of said third condensor, and a fourth condensor, operatively connected to an output of said buffer.

6. An apparatus according to claim 1, wherein said vertical synchronizing signals means comprises:

first receiving means for receiving said vertical synchronizing signal;

second receiving means for receiving a line high signal;

synchronizing signal detecting means, operatively connected to said first receiving means, for generating a detected signal which is in a high state when said vertical synchronizing signal is present and in a low state when said vertical synchronizing signal is not present;

inverting means for inverting said detected signal; and an AND circuit for ANDing the inverted detected signal and said line high signal.

7. An apparatus according to claim 1, wherein said switching means comprises a first switching section and a second switching section.

8. An apparatus according to claim 7, wherein said first and second switching sections include transistor means for selecting between said first and second transmission lines.

9. An apparatus according to claim 8, wherein said transistor means comprises an emitter follower transistor.

* * * * *